Oct. 1, 1929.  W. G. HARTWIG  1,729,720
THERMOSTATIC CONTROL FOR ICE MACHINES AND THE LIKE
Filed April 3, 1920  4 Sheets-Sheet 3
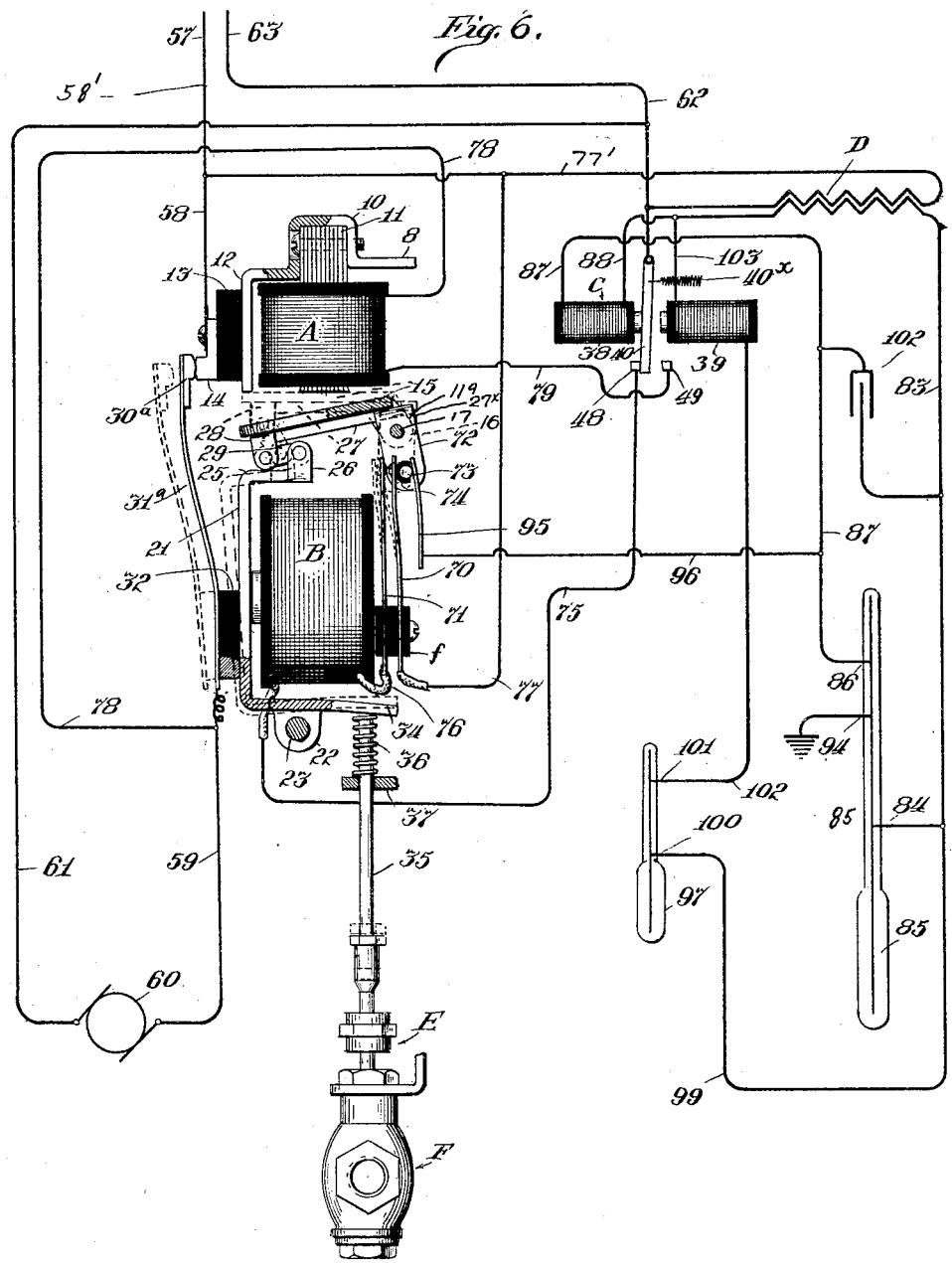

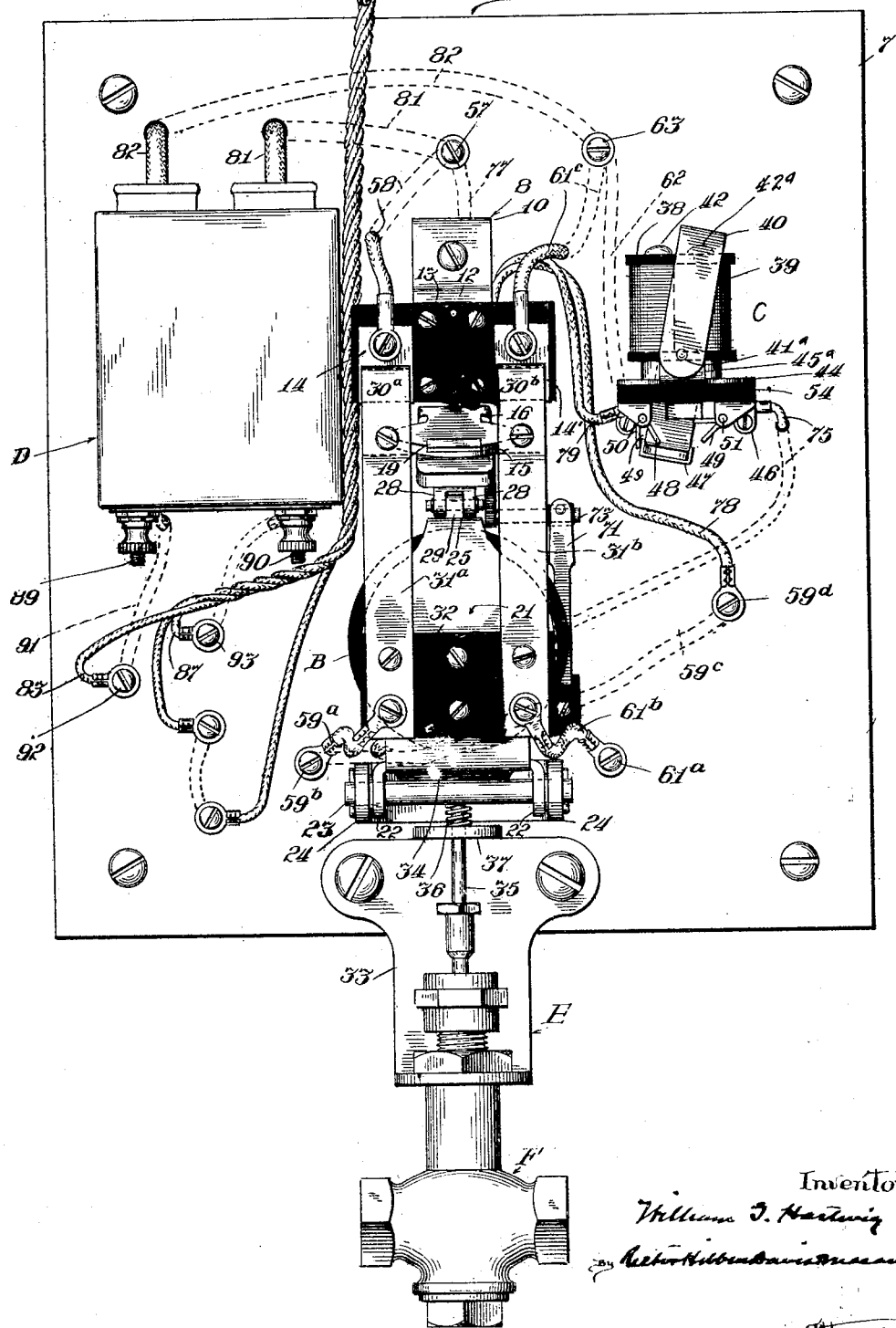

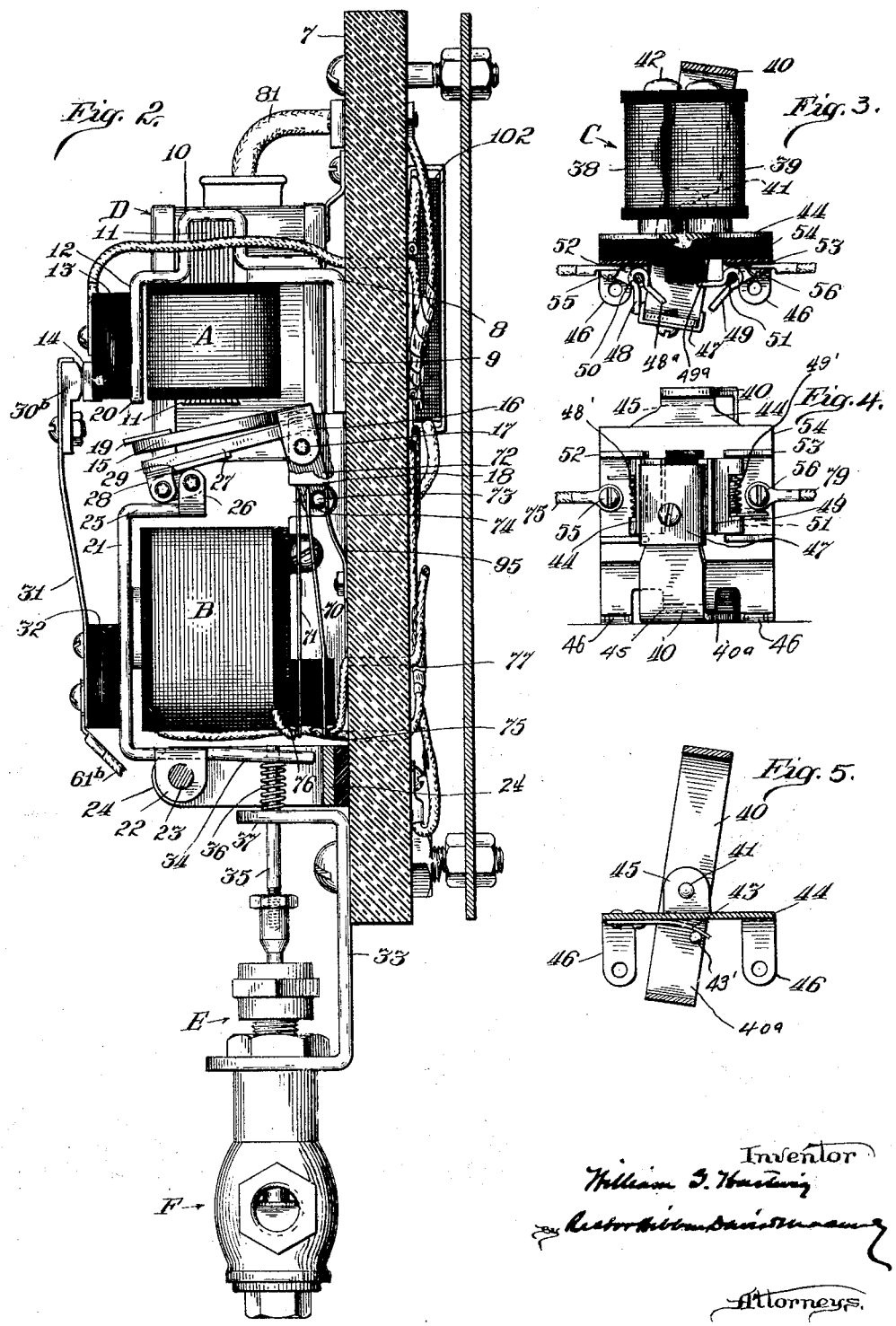

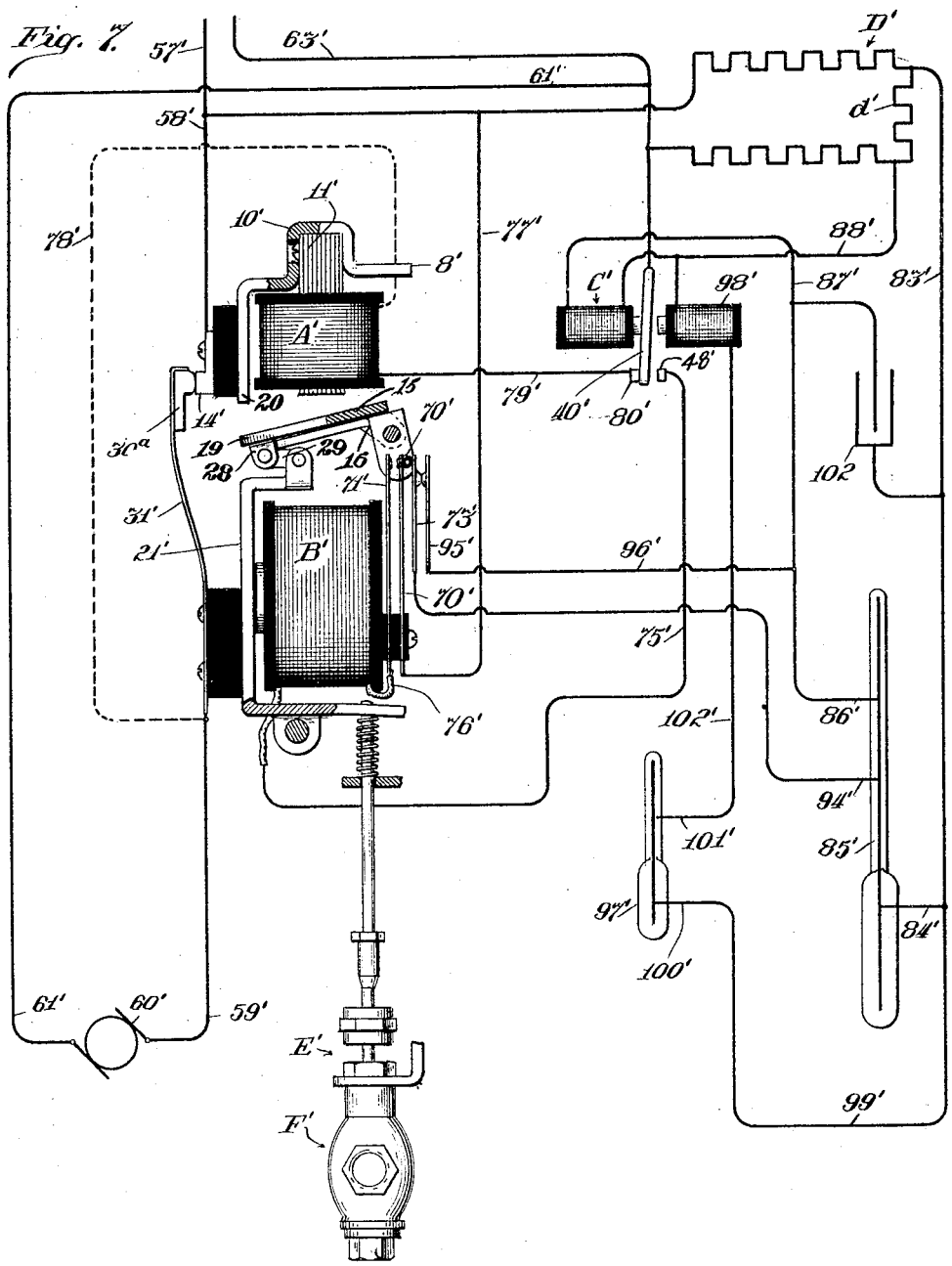

Patented Oct. 1, 1929

1,729,720

UNITED STATES PATENT OFFICE

WILLIAM G. HARTWIG, OF CHICAGO, ILLINOIS, ASSIGNOR TO E. J. MAGERSTADT, OF CHICAGO, ILLINOIS

THERMOSTATIC CONTROL FOR ICE MACHINES AND THE LIKE

Application filed April 3, 1920. Serial No. 370,922.

My invention is more particularly designed for use in connection with domestic refrigerators though, as will appear from the specific description it is applicable, with obvious modifications, to the control of temperature in many other relations and situations. Ordinarily the refrigerating plant of such domestic installations comprises a compressor for the refrigerating medium, ammonia, sulphur dioxid or other gas whose critical temperature is within ordinary ranges, a cooling chamber in which the temperature of the gas or liquid heated by compression is reduced by means of circulating water, and a refrigerating coil, which is located in the compartment to be cooled and in which the pressure of the liquids is relieved so that the liquid in again expanding to the gaseous form cools the coil and the surrounding compartment. When the temperature within the refrigerator or compartment to be cooled rises above the upper predetermined limit, the compressor is set in operation and the refrigerating medium compressed, cooled and expanded until the temperature in the enclosure is sufficiently reduced, when the compressor is again stopped. Ordinarily the compressor is operated by means of an electric motor. It is the purpose of my invention to provide means for governing the operation of the motor by controlling the supply of current thereto and for controlling the circulation of the refrigerating medium according to the temperature in the refrigerator or compartment to be cooled. By my improved construction the motor is set in operation when the temperature in the enclosure reaches a certain predetermined point and continues in operation until the temperature falls below a lower predetermined point, when the motor is again shut off until the temperature rises to the first mentioned point.

In my improved device I employ a thermostat of the thermometer type, in which the circuit is made and broken by means of a mercury column, which thermostat may directly control a relay. The latter controls the energization of two electro-magnets, the armatures of which are connected together and to the contactor controlling the motor circuit and to the valve controlling the water circulation for cooling in such manner that when the relay is energized by the closing of its circuit through the thermometer thermostat one of the magnets is energized and thereby closes the circuit through the motor and at the same time opens the circulation through the valve, and when the circuit of the relay is broken the other magnet is energized opening the motor circuit and closing the valve controlling the circulation of the cooling water. As will appear from the more detailed description following, the construction is such that there is no consumption of current except at the instant of closing and opening the contact of the motor circuit.

In the drawings, Fig. 1 is a front elevation of my improved apparatus for use with alternating current showing the preferred form of relay, magnets, valve operating mechanism and a transformer mounted upon a suitable support or switchboard; Fig. 2 is a side elevation of the same, parts being shown in vertical section; Fig. 3 a front elevation partly, in vertical section, of the preferred form of relay; Fig. 4 a bottom plan of the same, Fig. 5 a vertical section, of certain parts of the relay, other parts being removed for the sake of clearness; Fig. 6, a diagrammatic view showing slightly simplified forms of contactor, relay and wiring; and Fig. 7 a diagram of the wiring as modified for direct current.

Each part is identified by the same reference character wherever it occurs in the several views.

Referring first to Figs. 1 and 2, the support or switchboard is shown at 7 as a rectangular plate of insulating material such as slate or the like. Upon this support are mounted the contactor comprising magnets A, B of a suitable type for alternating current work and the circuit closer operated thereby and also the alternating current relay C, transformer D, and valve operating mechanism E, F being the valve for controlling the flow of water for cooling the refrigerating fluid. The transformer D and valve F may be of any suitable type and it is unnecessary here to describe them except to state that the valve F is of the reciprocating type.

The magnet B operates to close the motor circuit and to open the valve, when the temperature of the refrigerator or enclosure to be cooled rises too high. It is suitably supported from the switchboard with its axis horizontal. The magnet A, the function of which is to open the motor circuit and close the valve when the temperature has been sufficiently reduced, is secured to the switchboard by a bracket 8 of strap-iron, the depending leg 9 of which is screwed or otherwise fastened to the switchboard. Said strap is bent at 10 to form a recess which receives the upper end of the laminated core 11 of the magnet and is bent downward at its forward end as at 12 to form a support for the insulating plate 13. Plate 13 supports the stationary contacts 14, 14' of the double contactor which controls the motor circuit, which contacts are partially embedded in said insulating support. The armature 15 of the magnet A is formed with a pair of downwardly projecting lugs 16 (see dotted lines, Fig. 6) pivoted on a cross-pin 17 extending between the vertical strips 18, of which one only is shown in Fig. 2. Armature 15 is prolonged at 19 and coacts with the end 20 of bracket 8 to prevent the armature coming into actual contact with the core 11 of the magnet.

Armature 21 of magnet B is formed with a pair of lugs 22 which are pivoted upon pivot rod 23 secured in the ends of a yoke 24 which is suitably secured to the switchboard below the magnet B. At its upper end armature 21 is bent inwardly above the magnet B as at 25 and formed with a pair of upwardly extending ears 26. An arm 27 preferably of brass or other non-magnetic metal is pivoted by means of downward lugs to the same shaft or pin 17 to which armature 15 is pivoted, and is formed or provided at its free end with lugs 28. Between the pairs of lugs 28 on arm 27 and the lugs 26 on armature 21 is pivoted a link 29 by means of which motion is transmitted from the arm to the armature and vice versa. The arm 27 has a slight movement independently of the armature 15 but is oscillated in one direction thereby. As will now readily appear, when armature 21 is attracted by its magnet B the upper end of said armature is drawn toward the switchboard and by means of the link 29 draws downward the arm 27 and this motion is communicated by the latter to the armature 15, and as the link 29 is adapted to pass the dead center, armature 21 is locked against outward movement in the position shown in Fig. 2 unless and until the armature 15 and arm 27 are drawn upward. When the armature 15 and arm 27 are drawn upward the link 29 assumes a position substantially perpendicular to said arm and armature and locks them in attracted position unless and until the armature 21 is drawn inward. Thus in either position the armature which has last been attracted is locked until the other armature is attracted.

The movable contacts $30^a$, $30^b$ of the contactor which controls the motor circuit are carried by spring metal strips $31^a$, $31^b$ which are secured to an insulating block 32 carried by armature 21 and therefore move together; they simultaneously make and break the motor circuit in two places. One of these contacts, as will hereafter appear, also opens and closes the circuit of the magnet A.

Armature 21 also serves to operate the valve F which controls the circulation of the refrigerant. This valve, F, is preferably mounted upon the insulating plate or support 7 by a bracket 33, the valve stem 35 of the reciprocating valve extending upward and being guided in a hole in the bracket. The armature 21 is formed with a tail piece 34 which extends rearwardly under the magnet and above the valve stem and depresses the latter in an obvious manner to open the valve when the armature is attracted by its magnet. Suitable spring means are employed to raise the valve when released by the tail piece of the armature.

Armature 15 of magnet A also controls the opening and closing of the energizing circuit of magnet B. For this purpose a pair of spring contacts 70—71 supported on insulating block $f$ are inserted in the circuit of magnet B the resiliency of the contacts normally forcing them apart. One of the pivoting lugs of the armature 15 is continued downward at 72 and supports the laterally projecting pin 73, one side of which is covered with insulating material as at 74. By reference to Figs. 2 and 6 it will be seen that the construction is such that when the armature 15 is attracted by magnet A insulated side of pin 73 is forced against spring contact 70, presses it into engagement with contact 71, thus closing the circuit of magnet B at this point. When the armature 15 drops, however, the pressure on contact 70 is relieved so that the circuit of magnet B is broken.

In the preferred form of relay shown in Figs. 1, 3, 4 and 5 a pair of magnets 38, 39 is mounted on the base plate 44, which is supported on the switchboard plate by screws inserted in the downwardly turned lugs 46. The armature which is common to the two magnets is in the form of a strip or strap 40 of metal which is pivoted at 41, $41^a$ to lugs 45, $45^a$ bent upward from the supporting plate 44 and the armature is arched upward over said magnets. One leg $40^a$ of the armature extends downwardly beneath its pivot and is bent inwardly below the plate 44 and a contact plate 47 is secured thereto, the ends of which are bent upwardly for a purpose which will appear. Leg 40ª carries a pin 43ª which engages the plate spring 43 on plate 44, which spring tends to restore the armature to normal position, see Fig. 5. A block 54 of insulating material is secured to the underside of plate 44 and bracket plates 52, 53 are secured to the underside of said block and oppositely positioned with respect to the pivot of the armature. The ends of each plate 52, 53 are bent down to form perforated ears which receive the ends of pivot pins 50, 51 carried by the respective plates. Contacts 48, 49 are formed from short strips of sheet-metal bent about said pins and depending beneath the same. Springs 48′, 49′ are mounted on said pins intermediate the lugs of said contacts and bear upon the latter to normally force them inward and upward. The inner members 48ª, 49ª of the respective contacts limit the inward movement of the latter and hold them in position so that the outer members of the contacts may be engaged by the respective upwardly bent ends of the contact strip 47, see Fig. 3. It will thus be seen that when either of these pivoted contacts is engaged by the contact plate 47 it yields, the frictional movement between the pivoted contact and contact plate serving to keep the contact surfaces clean. The lead-wires 75, 79 to be presently referred to are connected to the respective plates 52, 53 by screws 55, 56.

The preferred embodiment of my invention comprises the contactor with the double contact and the improved relay as shown in Figs. 1 to 5 described above, but I may employ the somewhat simpler apparatus shown in Fig. 6 in which case the wiring and connections employed are also simpler. Thus in the diagrammatic Fig. 6 I have shown the contactor as of the single break type and a relay of known form.

It will be convenient to first describe the somewhat simpler device of Fig. 6. In this figure the parts are shown in the positions which they occupy just after relay coil 38 has been energized, due to a rise in temperature in the refrigerating chamber above that for which the apparatus is designed. The circuit by which the relay is energized will be described later. When the relay armature 40 is moved into engagement with the contact 48, the contactor parts including the armatures, contact 30ª and spring contacts 70, 71 being previously in the dotted-line position a circuit is closed through the magnet B, as follows: from line at 63, through wire 62, armature 40, contact 48, wire 75, the coil of magnet B, spring contacts 71, 70 and wires 77, 77′ and 58′ to line 57. The magnet B being thus energized attracts its armature and the parts assume the full line position of Fig. 6, pin 73 moving away from spring contact 70 to permit it to separate from contact 71 as armature 15 drops, thus breaking the circuit through coil B. At the same time contact 30ª is brought into engagement with contact 14, circuit is closed through the motor as follows: from line at 57, through wire 58′, contacts 14, 30ª, spring arm 31ª, wire 59, motor 60, wires 61, 62 to line. The motor driving the refrigerating machinery is thus kept in operation and continues to operate until the temperature drops, so that the thermostat controlling the circuit of relay coil 38 opens the same, de-energizing the relay and permitting the armature 40 thereof to leave contact 48 and engage contact 49. When this occurs, the contact 30ª being still in engagement with contact 14, a circuit is closed through the magnet A as follows: from line at 63, through wire 62, armature 40, contact 49, wire 79, the coil of magnet A, wire 78, spring arm 31ª, contact 30ª, contact 14 and wires 58, 58′ to line at 57. The magnet A being thus energized attracts its armature, swinging the contact 30ª away from contact 14 and thus opening the circuit of the motor and of magnet A. The upward movement of the armature 15 of magnet A again puts the contacts 70, 71 together as above described.

In the above described arrangement but one of the contacts 30ª with its contact arm 31ª is employed. In case the preferred form of construction is adopted and both of the double contacts used the connections adopted are those shown in Figs. 1 and 2. Contact 14 is connected to line at 57 by wire 58 as before. The contact spring arm 31ª, however, instead of being connected directly by wire with the motor, is connected by wire 59ª with post 59ᵇ and the latter is connected by wire 59ᶜ at the back of the board with binding post 59ᵈ. Said binding post is connected by wire 59 with the motor. The other motor terminal is connected by wire 61 with post 61ª, and the latter by wire 61ᵇ with the spring contact arm 31ᵇ. The motor circuit is completed from the terminal 14′ engaged by contact 30ᵇ to line at 63 by wire 61ᵇ. In this construction wire 78 leading from one terminal of the magnet A is connected up to binding post 59ᵈ and the other terminal of the magnet A is connected as before to contact 49, the energizing circuit of magnet A being traced as follows: from line at 57 through wire 58, contacts 14, 30ª, spring contact arm 31ª, wires 69ª, post 59ᵇ, wire 59ᶜ, wire 78, the coil of said magnet, wire 79, contact 49, contact face 47, armature 40, the frame of the relay and wire 62 to outlet at 63.

From the above description of the magnets, the relays, and their connections, the operation of the device as thus far described is apparent. When the relay closes the circuit on the rise of temperature as above described, the contacts 70, 71 being in engagement by reason of the position of the armature 15 and arm 27, magnet B attracts its armature, thus closing the contactor and at the same time swinging the armature 15 downwardly to the full line position shown in Fig. 6, which permits the spring contacts 70, 71 to separate and thus immediately open the circuit of magnet B. By reason of the connection of the armatures of the respective magnets previously described, the armature of magnet B is thus locked in attracted position, notwithstanding that said magnet is immediately de-energized as described. In this position of the armature of magnet B the motor circuit is closed and the circulation valve open as previously described. The operation of the refrigerating machine lowers the temperature in the refrigerator or other enclosure to be cooled, until the thermostat breaks the circuit of the relay as hereinafter described and the armature thereof shifts from contact 48 to contact 49. The circuit of magnet A is thereby closed and the circuit of magnet B opened at the relay. Magnet A then attracts its armature, thus opening the contactor at 14, 30$^a$ and 14′, 30$^b$, breaking the motor circuit and the circuit of magnet A. In the meantime, however, armature 15 of magnet A is locked in attracted position by the link 29, in which position it closes the contacts 70, 71 preparatory to the next energization of the magnet B. The opening of the contactor, of course, breaks the circuit of the magnet A.

In the form of the device shown in Figs. 1 to 6 designed for alternating current work, the relay C is energized from the secondary of a transformer D, the primary of which is connected as shown diagrammatically in Fig. 6 between wire 58 and wire 62 leading to the line terminals. In Fig. 1 the transformer D is shown as connected directly by wires 81, 82 shown partially in full and partially in dotted lines to the terminals 57, 53 respectively. One terminal of the secondary of the transformer is connected by wire 83 with the lower contact 84 of a thermometer thermostat 85. A second contact 86 is located on the thermometer thermostat at a point corresponding to the highest range of temperature to be permitted and is connected by a wire 87 to one terminal of the relay magnet C, the other terminal of the relay being connected by wire 88 to the other end of the secondary of the transformer. Thus, whenever the temperature in the refrigerator or other enclosure to be cooled rises to a point at which the mercury-column reaches contact 86, the relay is energized with the result that magnet B is energized and the circuit of the motor closed and the valve controlling the circulation opened. In the actual construction as shown in Fig. 1 the secondary of the transformer is provided with binding posts 89, 90. One of these binding posts, say post 89, may be connected up by wire 91 with a binding post 92 from which wire 83 leads to terminal 84. The other binding post 90 is connected by a wire 88, (illustrated only in the diagrammatic figure to avoid confusion) with one terminal of the relay, the other terminal of which is connected to binding post 93 and from said binding post wire 87 leads to the upper contact 86 of the thermostat.

In order that the operation of the ice machine may not be stopped as soon as the mercury again falls below the contact 86 but continued until some lower predetermined temperature be reached, I employ an additional contact inserted in the thermostat at a point corresponding to said temperature, and ground the same on the conducting framework supporting the magnet with which bar 27, lug 72 and pin 73 are in conductive relation, and arrange a spring contact 95 to be engaged by the un-insulated side of said post 73 when the parts are in the full line position shown in Fig. 6, said spring contact 95 being connected by wire 96 with wire 87 leading to contact 86. With this arrangement and connection of parts after the contactor has been closed in the manner heretofore described, it will remain closed until the temperature falls to a point corresponding to contact 94, the relay continuing to be energized through contact 94, the frame on which it is grounded, bar 27, lug 72, spring contact 95, wire 96, wire 87, the coil of said relay, the secondary of the transformer, wire 83 and contact 84. When this circuit is broken by the descent of the column of mercury below the contact 94 the relay is de-energized and the contactor is opened in the manner heretofore described. The attraction by magnet A of its armature breaks the circuit through contact 94 at the spring contact 95 so that the relay is not again energized until the mercury closes the circuit at 86. Thus the constant starting and stopping of the motor is avoided.

It is obviously desirable to stop the operation of the machine in the event that from any cause the supply of water used for cooling the gases after compression fails. For this purpose I insert in the water surrounding the coil in which the compressed refrigerant is cooled, a thermostat 97 of the thermometer type and connect it in the circuit of the secondary of the transformer with the magnet 39 arranged to assist the spring 40$^x$ to over-power the relay magnet C when said magnet 39 is energized. The circuit of this safety thermostat may be traced as follows: the secondary of the transformer D, wire 83, wire 99, contact 100, the mercury of the thermostat, upper contact 101 (which is inserted at a point corresponding to the maximum temperature to be permitted), wire 102, the coil of magnet 39 and wire 103 to the other terminal of the secondary of the thermostat. Thus when the temperature of the water in the cooling tank approaches the danger point the magnet 39 is energized to over-power the relay magnet and permit the contactor to open.

With the described construction the motor of the ice machine continues to operate until the temperature within the refrigerator or the like drops to the required point, when the circuit of the motor is opened and remains open until the temperature within the refrigerator rises to the maximum point to be permitted when the motor and the ice machine compressor are again put in operation. In case, however, the temperature of the cooling water rises for any reason beyond a predetermined point, the operation of the machine is cut off and remains so until the temperature of the water again drops.

In case direct current is to be used with my apparatus it may be changed in an obvious manner such as shown, for example, in the accompanying diagram shown in Fig. 7. In said figure the parts corresponding to similar parts in the device as arranged for alternating current are marked with the same letters but with a prime affixed thereto. The arrangements of magnet, contactor, relay, thermostat, motor and valve are substantially the same. Instead of the transformer a high resistance D' is introduced across the line terminals 57' 63' and a small section d' of said resistance is shunted by a circuit including the thermostat and relay, as follows: wire 83', contact 84', thermostat 85', contact 86', wire 87', the coil of relay C' and wire 88'. In order to protect the thermometer thermostat a condenser 102 is connected across the contacts of said thermostat. The thermostat 97' and magnet 98' for protecting the device against rise of temperature due to failure of cooling water is connected up in a similar manner to that previously described, the circuit comprising wire 83', wire 99', contact 100', thermostat 97', contact 101', wire 102', said magnet, and wire 88'. The circuit for determining the drop in temperature before the motor circuit is again opened is also similar to that in the alternating current device and comprises contact 94', contact 73', contact 95' and wire 96'. Armature 40' of the relay is movable between contacts 80' and 48', controlling respectively the circuits of magnets A' and B'. When said armature is in engagement with contact 48' it closes a circuit for energizing magnet B' as follows: contact 48', wire 75', the coil of said magnet, wire 76', spring contact 71', spring contact 70' and wire 77' to wire 58', to terminal 57'. When the armature of the relay is in engagement with contact 80' it closes a circuit as follows: contact 80', wire 79', the coil of magnet A', wire 78', contact 30ª', contact 14' and wire 58' to line at 57' The motor circuit extends from line at 63' through wire 61', motor 60', wire 59', contact 30ª', contact 14' and wire 58' to terminal at 57'. The valve is operated in the previously described manner.

While I have described the device as designed for operating an ice machine, it may be employed for controlling the operation of motors driving machines either for cooling or heating purposes or for directly controlling heating means, the changes necessary to adapt it for such various uses being obvious to anyone skilled in the electric art.

It will be obvious also that the energizing circuits of the respective magnets may be directly controlled by thermostatic means without the interposition of the relay, though the latter is of particular value where the thermostatic element employed is of a sensitive character.

I claim:

1. In a device of the class described, a pair of magnets mounted with their axes substantially perpendicular to each other, pivoted armatures for the respective magnets, a pivoted bar 27 adapted to move one of said armatures but having a movement independent thereof, a link connecting said bar to the other of said armatures and means for alternately energizing said magnets.

2. In a device of the class described, a pair of magnets arranged perpendicular to each other, a pivoted armature for one of said magnets, a bar pivoted adjacent said armature and having a limited movement independent thereof and adapted to move said armature to open position, and to be moved by said armature when the latter moves to attracted position, a pair of contacts in the circuit of the other of said magnets, means operated by said pivoted bar to close said contacts, a pivoted armature for the second of said magnets, a link connecting the last mentioned armature to the pivoted bar, and a switch operated by the latter said armature in circuit with the coil of the last said magnet.

WILLIAM G. HARTWIG.